US008544327B2

(12) United States Patent
Dalmont et al.

(10) Patent No.: US 8,544,327 B2
(45) Date of Patent: Oct. 1, 2013

(54) ACOUSTIC IMPEDANCE SENSOR DESIGNED TO MEASURE THE INPUT ACOUSTIC IMPEDANCE OF A WAVEGUIDE

(75) Inventors: Jean-Pierre Dalmont, La Guierche (FR); Jean-Christophe Le Roux, Le Mans (FR)

(73) Assignees: Universite du Maine, Le Mans (FR); Centre de Transfert de Technologie du Mans, Le Mans (FR)

( * ) Notice: Subject to any disclaimer, the term of this patent is extended or adjusted under 35 U.S.C. 154(b) by 274 days.

(21) Appl. No.: 13/001,479

(22) PCT Filed: Jun. 26, 2009

(86) PCT No.: PCT/EP2009/058047
§ 371 (c)(1),
(2), (4) Date: Apr. 18, 2011

(87) PCT Pub. No.: WO2010/003840
PCT Pub. Date: Jan. 14, 2010

(65) Prior Publication Data
US 2011/0192231 A1    Aug. 11, 2011

(30) Foreign Application Priority Data
Jun. 27, 2008  (FR) ...................................... 0854310

(51) Int. Cl.
*G01H 15/00*    (2006.01)
*G01N 29/028*    (2006.01)

(52) U.S. Cl.
USPC .............................................. 73/589; 73/602

(58) Field of Classification Search
USPC .......................................... 73/589, 584, 602
See application file for complete search history.

(56) References Cited

U.S. PATENT DOCUMENTS

| 4,397,187 | A | | 8/1983 | Stribling | |
|---|---|---|---|---|---|
| 4,413,504 | A | * | 11/1983 | Voigtman et al. | 73/61.58 |
| 4,510,812 | A | * | 4/1985 | Feng | 73/644 |
| 5,009,102 | A | * | 4/1991 | Afromowitz | 73/590 |
| 5,452,265 | A | * | 9/1995 | Corsaro | 367/152 |
| 6,134,967 | A | * | 10/2000 | White | 73/588 |
| 7,007,546 | B2 | * | 3/2006 | Andle | 73/54.41 |
| 7,181,957 | B2 | * | 2/2007 | Andle | 73/54.41 |

OTHER PUBLICATIONS

Singh et al., "Acoustic impedance measurement using sine sweep excitation and known volume velocity technique", *Journal of the Acoustical Society of America USA*, vol. 64, No. 4, Oct. 1978, pp. 995-1003.
Bernadhe et al., "Survey of impedance methods and a new piezo-disk-driven impedance head for air columns", *Journal of the Acoustical Society of America USA*, vol. 81, No. 4, Apr. 1987, pp. 1152-1167.
International Search Report for PCT/EP2009/058047, dated Oct. 14, 2010.
Written Opinion for PCT/EP2009/058047, dated Oct. 14, 2010.
Preliminary Examination Report on Patentability in English for PCT/EP2009/058047; mailed Mar. 16, 2011.

* cited by examiner

*Primary Examiner* — J M Saint Surin
(74) *Attorney, Agent, or Firm* — Nixon & Vanderhye, PC

(57) ABSTRACT

The present invention concerns an acoustic impedance sensor designed to measure the input acoustic impedance of a waveguide. This sensor is characterized in that the source is a piezoelectric pellet that makes it possible for the determination of the acoustic impedance of a passive acoustic element to remain coherent for low frequencies while preserving an inexpensive implementation of the sensor.

4 Claims, 3 Drawing Sheets

ACOUSTIC IMPEDANCE SENSOR DESIGNED TO MEASURE THE INPUT ACOUSTIC IMPEDANCE OF A WAVEGUIDE

This application is the U.S. national phase of International Application No. PCT/EP2009/058047 filed 26 Jun. 2009 which designated the U.S. and claims priority to French Patent Application No. 08/54310 filed 27 Jun. 2008, the entire contents of each of which are hereby incorporated by reference.

The present invention concerns an acoustic impedance sensor designed to measure the input acoustic impedance of a waveguide.

In many fields of application, it is necessary to characterise acoustic passive elements by measuring the acoustic impedance thereof, for example in the field of musical instruments where knowledge of the intrinsic characteristics of a wind instrument makes it possible to check the tuning of this instrument and/or to model the functioning thereof, and also in the field of materials where knowledge of the intrinsic characteristics of a material such as for example the coefficient of absorption thereof makes it possible to classify this material and compare it with other types of material.

The characterisation of acoustic passive elements is made possible by using an acoustic impedance sensor as illustrated in FIG. 1.

The acoustic impedance sensor CA is associated sealingly with a load which can be assimilated, from an acoustic point of view, to a waveguide GU.

In the case where the element measured is a sample of material, the sample is placed in a rigid tube closed at one of the ends thereof and the open end of the tube is fixed sealingly to the acoustic impedance sensor CA.

Once the load is in place, the acoustic impedance sensor CA is excited by a sound source electrically controlled so as to generate a controlled acoustic output for a predetermined range of frequencies. The acoustic impedance sensor CA then determines the acoustic impedance Z of the flat surface S defined by a so-called reference plane PR for the range of frequencies of the source. This reference plane PR is parallel to the transverse section of the waveguide GU and is located at an open end of the waveguide generally referred to as the entrance of the waveguide. The load is then characterised by the acoustic impedance thus determined, an acoustic impedance that is usually called the input acoustic impedance.

The input acoustic impedance Z is defined, in harmonic mode, as the ratio of the mean acoustic pressure P on the surface S and the acoustic rate U passing through the flat surface S:

$$Z = \frac{P}{U}$$

The input acoustic impedance Z is a complex quantity that is a function of the frequency of the wave that propagates in the waveguide GU. The acoustic rate U is defined as the product of the mean velocity v of a particle traversing the surface S and the value of the surface S. Thus the input acoustic impedance Z is sometimes expressed as the ratio of the mean acoustic pressure P and the mean velocity v of a particle. The two definitions therefore differ only by a constant, in this case the value of the surface S.

There exist in the prior art several methods for determining the input acoustic impedance Z. The present invention concerns those that are based on the measurement of a transfer function $H_{12}$ between two electrical quantities $e_1$ and $e_2$ measured at the terminals of two microphones denoted M1 and M2, that is to say by dynamic pressure sensors. The principle of this method of determining the input acoustic impedance Z is as follows.

Assuming that the acoustic impedance sensor CA is linear and that the microphones M1 and M2 are sensitive to the variations in acoustic pressure P and acoustic rate U at the entrance to the waveguide GU, that is to say at the reference plane PR, the transfer function $H_{12}$ is given by equation (1)

$$H_{12} = \frac{e_2}{e_1} = K \frac{Z + \beta}{1 + \delta Z} \quad (1)$$

in which K, $\beta$ and $\delta$ are complex functions of the excitation frequency, functions that reflect the acoustic behaviour of the acoustic impedance sensor CA.

Measuring the transfer function $H_{12}$ therefore makes it possible to deduce the input acoustic impedance Z once the functions K, $\beta$ and $\delta$ are known. This is because, from equation (1), equation (2) is obtained:

$$Z = \frac{H_{12}/K - \beta}{1 - \delta H_{12}/K} \quad (2)$$

In the case where the microphone M2 is rather sensitive to the acoustic pressure P and the microphone M1 rather sensitive to the acoustic rate U, the function K can then be interpreted as the first-order response of the acoustic impedance sensor, and $\beta$ and $\delta$ are then interpreted as correction parameters.

One of the major difficulties with this method stems from the fact that the three complex functions K, $\beta$ and $\delta$ are in principle unknown. To determine them, a prior so-called calibration phase is implemented. This phase of calibrating the acoustic impedance sensor CA consists of fixing in turn three so-called reference loads and for each of these three loads performing a measurement of acoustic impedance, referred to as a reference impedance. For more details, refer to J.-P. DALMONT 2001 J. Sound Vib. 243 (3), 427-439. *Acoustic impedance measurements Part I: a review*).

The reference impedances are in general closed tubes, possibly very long so that the input acoustic impedance at the reference plane PR can be assimilated to the characteristic impedance of the tube. However, these reference loads may also be of zero length so that the input acoustic impedance is considered to be infinite. The calibration phase with three loads is relatively expensive to implement, in particular because of the necessity for the three measurements to be done under the same temperature conditions.

In order to alleviate these implementation constraints, it is possible to determine a physical model of the acoustic impedance sensor that comprises fewer unknowns, thus reducing the number of measurements during the calibration phase. For example, it is known that acoustic impedance sensors using a so-called dual-microphone acoustic impedance determination method can be modelled physically by a model in which the only unknown is the ratio of the sensitivities of the microphones. The calibration phase is then reduced to measuring a single reference impedance. For more details, refer to *ISO* 10534-2, Acoustics—Determination of sound absorption coefficient and impedance in impedance tubes—Part 2: *Transfer-function method*.

FIG. 2 shows schematically an acoustic impedance sensor according to a prior art, referred to as a capillary sensor. For more details, refer to R. CAUSSE, J. KERGOMARD and X. LURTON 1984 Journal of the Acoustical Society of America 75(1), 241-254. Input impedance of brass instruments—Comparison between experiment and numerical models., and according to J. KERGOMARD and R. CAUSSE 1986 *Journal of the Acoustical Society of America* 79(4), 1129-1140. Measurement of acoustic impedance using a capillary: an attempt to achieve optimization.

The acoustic impedance sensor CA1 comprises a loudspeaker HP as a source and a capillary tube or array of capillary tubes TU. One of the ends of the tube or array of tubes TU is connected to the waveguide GU while the other end of the tube or array of tubes TU is connected to the front face of the loudspeaker HP so as to form a cavity CAV1.

Two microphones M1 and M2, which make it possible to convert a measured acoustic pressure into an electrical quantity, are positioned at the ends of the tube or array of tubes TU, each at one of its ends, and each microphone M1 and M2 is connected to digital calculation means (not shown) that calculate the transfer function $H_{12}$ from the electrical quantities $e_1$ and $e_2$ measured at the terminals of the two microphones M1 and M2.

When the loudspeaker HP emits a wave at a given frequency, that is to say excites the acoustic impedance sensor CA1, the acoustic pressure $p_1$ on the flat surface defined by a reference plane PR1 parallel to one of the ends of the tube or array of tubes TU, that is to say the acoustic pressure in the cavity CA1, is measured by the microphone M1. In addition, the acoustic pressure $p_2$ on the surface S at the reference plane PR is measured by the microphone M2. The acoustic pressure $p_1$ in the cavity CAV1 is as a first approximation proportional to the acoustic rate U of the source through the tube or array of tubes TU.

Thus the transfer function $H_{12}$ of equation (1) is the one that determines the passage of the wave from the cavity CAV1 to the entrance of the guide GU through the tube or array of tubes TU. It is written as $$H_{12} = \frac{p_2 \cdot s_2}{p_1 \cdot s_1} \quad (3)$$

in which s1 and s2 designate the sensitivities of the microphones M1 and M2.

Although the acoustic impedance sensor CA1 procures measurements that make it possible to obtain a coherent determination of the input acoustic impedance Z, the inventor has observed that strong attenuations occur in the tube or array of capillary tubes TU. These strong attenuations give rise to a low signal/noise ratio when the excitation frequency is around a few tens of Hertz, then causing an incoherent determination of the transfer function and consequently of the input acoustic impedance Z. Thus the acoustic impedance sensor CA1 is limited to a characterisation of passive acoustic elements for a range of high frequencies, thus limiting the possibility of characterising such elements for frequency ranges extending towards the low frequencies.

FIG. 3 shows schematically another acoustic impedance sensor according to a prior art. For more details, refer to R. SINGH and M. SCHARY 1978 Journal of the Acoustical Society of America 64, 995-1003. Acoustical impedance measurements using sine sweep excitation and known volume velocity technique.

The acoustic impedance sensor CA2 comprises a loudspeaker HP as a source and two microphones M1 and M2 connected to digital calculation means (not shown) that calculate the transfer function $H_{12}$ from the electrical quantities $e_1$ and $e_2$ measured at the terminals of the two microphones M1 and M2.

The front and rear of the loudspeaker are made airtight vis-à-vis each other. In addition, the rear of the loudspeaker HP is closed by a rigid envelope so as to form a so-called rear cavity CAV1, while the front of the loudspeaker HP forms cavity CAV2 open onto the entrance of the waveguide GU. One of the microphones, in this case M1, is positioned on the rear of the cavity CAV1 while the other microphone, in this case M2, is positioned in the cavity CA2 at the reference plane PR.

When the loudspeaker HP emits a wave at a given frequency, that is to say excites the acoustic impedance sensor CA2, firstly the acoustic pressure $p_1$ in the rear cavity CAV1 is measured by the microphone M1 and secondly the acoustic pressure $p_2$ in the cavity CAV2 is measured by the microphone M2.

The acoustic pressure $p_1$ in the rear cavity CAV1 is proportional to the acoustic output U of the source (to within the sign), the transfer function $H_{12}$ is then determined by the calculation means and the input acoustic impedance Z is deduced from this transfer function as explained previously.

The inventor has observed that theoretically the acoustic impedance sensor CA2 allows a coherent determination of the input acoustic impedance Z even for frequencies of a few tens of Hertz. However, use of the acoustic impedance sensor CA2 is difficult in particular firstly because of the dimensions of the loudspeaker HP, which must be small, then making it difficult to manufacture, and secondly because of the sealing between the front and rear face of the loudspeaker HP, which must be perfect in order not to bias the measurement of the acoustic pressures $p_1$ and $p_2$ by the microphones M1 and M2.

To overcome the problems disclosed above by current acoustic impedance sensors, the present invention concerns an acoustic impedance sensor designed to measure the input acoustic impedance of a waveguide, the said sensor comprising a source coupled to the waveguide by means of an open cavity, referred to as the front cavity, delimited by the said source and emerging on the said waveguide, and a cavity, referred to as the rear cavity, closed by the said source, the acoustic pressure in each cavity being measured by a microphone. The said sensor is characterised in that the said source is a piezoelectric pellet mounted between the rear cavity that is in the form of a straight cylinder and the front cavity that is in the form of a straight cylinder, the height of the front cavity and the height of the rear cavity being respectively less than one quarter and one half of the wavelength of the excitation emitted by the said piezoelectric pellet and the diameters of the two cavities being less than half of the said wavelength.

Such an acoustic impedance sensor enables the input acoustic impedance Z to be determined for a wide range of frequencies ranging from a few Hertz to a few thousand Hertz, thus allowing complete characterisation of a passive acoustic element. Its internal structure makes it possible in fact to be able to obtain acoustic pressure measurements at low frequencies unlike acoustic impedance sensors of the prior art, without for all that requiring tricky and therefore expensive use of this sensor.

The abovementioned features of the invention, as well as others, will emerge more clearly from a reading of the following description of an example embodiment, the said description being given in relation to the accompanying drawings, among which:

Figure 1:
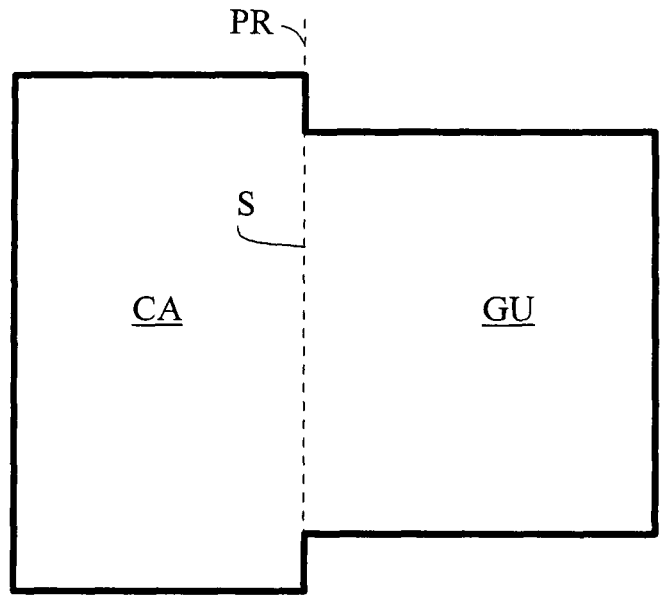
FIG. 1 shows schematically an acoustic impedance sensor associated with a load.
Figure 2:
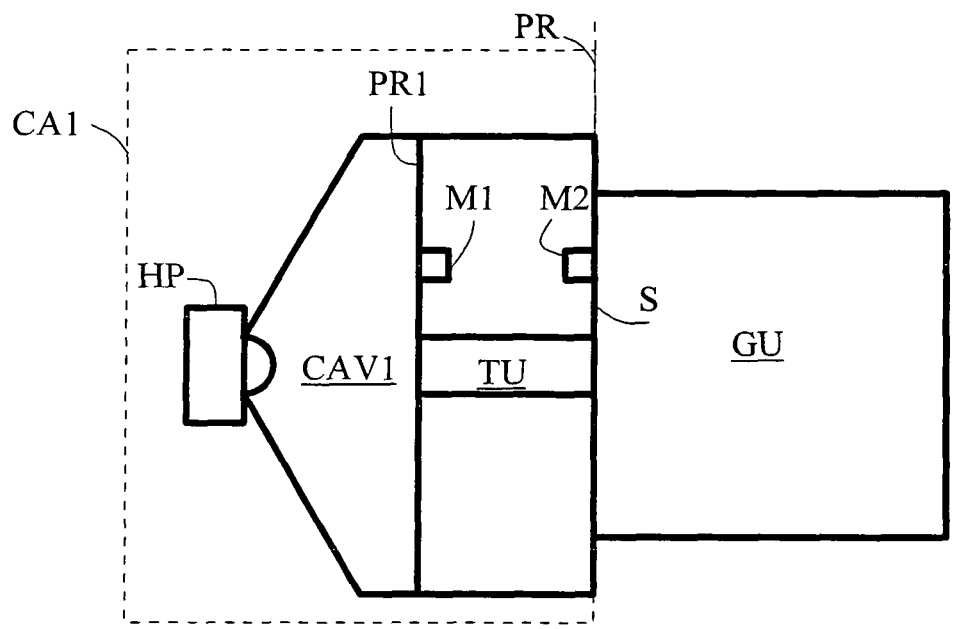
FIG. 2 shows schematically an acoustic impedance sensor according to a prior art.
Figure 3:
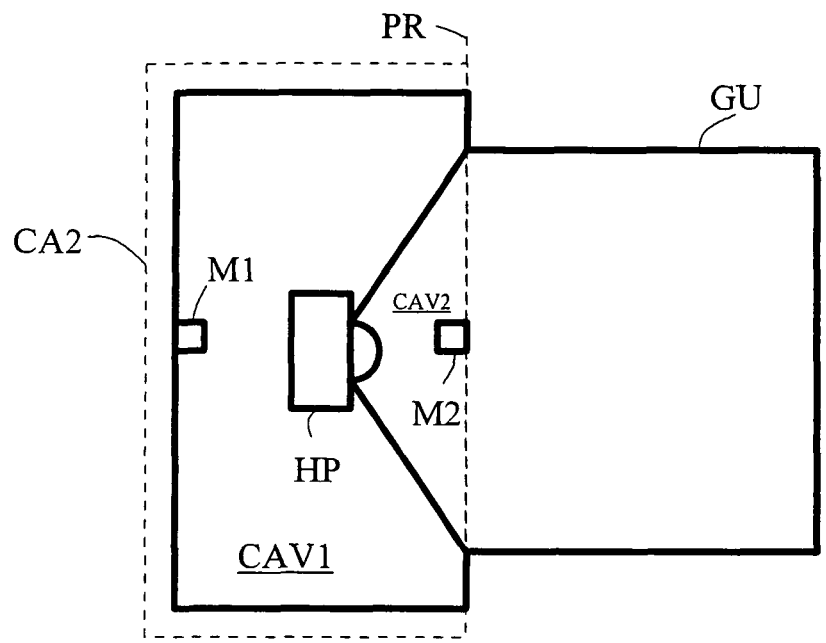
FIG. 3 shows schematically another acoustic impedance sensor according to another prior art.
Figure 4:
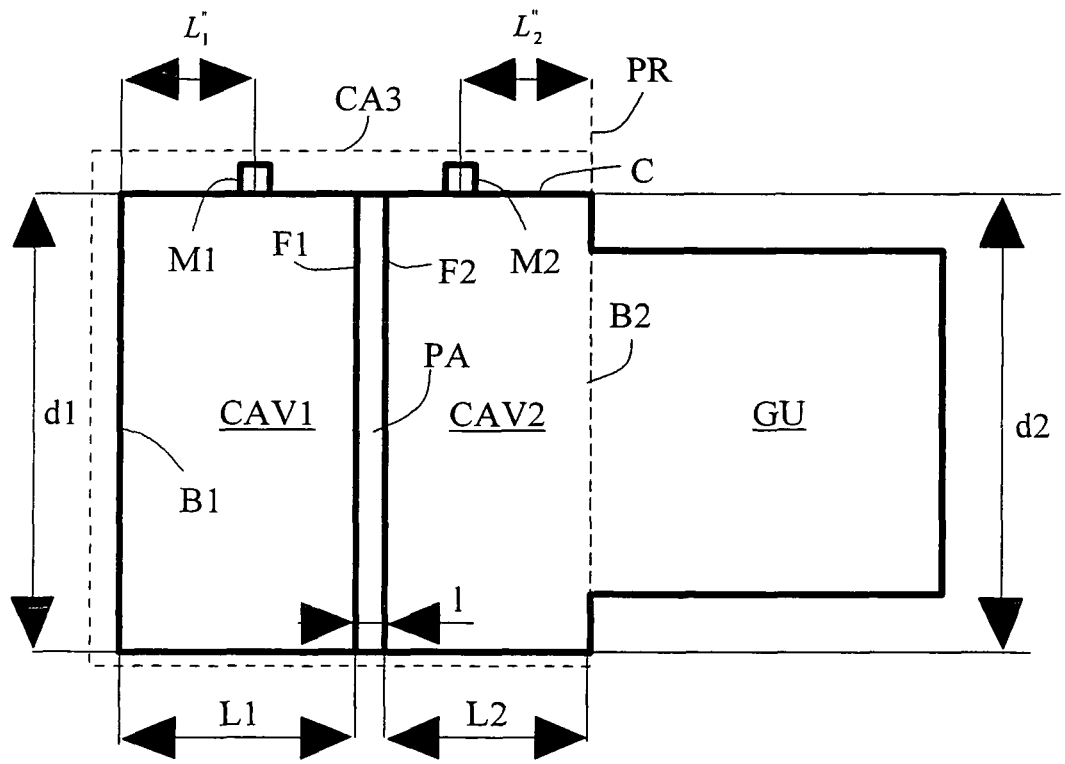
FIG. 4 shows schematically an acoustic impedance sensor according to the invention.

In FIG. 4, the acoustic impedance sensor CA3 comprises a piezoelectric pellet PA as a source, a rear cavity CAV1, a front cavity CAV2 and two microphones M1 and M2 connected to digital calculation means (not shown) that calculate the transfer function $H_{12}$ from electrical quantities $e_1$ and $e_2$ measured at the terminals of the two microphones M1 and M2.

The rear cavity CAV1 has a straight cylindrical shape of diameter $d_1$ and length L1. One of the bases thereof, in this case B1, is closed while the other base is open. For example, the cavity CAV1 is obtained from a solid cylindrical body in which a blind hole of diameter $d_1$ is produced.

The front cavity CAV2 has a straight cylindrical shape of diameter $d_2$ and length L2, the two bases of which are open. For example, the cavity CAV2 is obtained from a solid cylindrical body in which a hole of diameter $d_2$ is pierced.

The piezoelectric pellet PA, of straight cylindrical shape and length l, is mounted clamped between the cavities CAV1 and CAV2 so as to make the cavity CAV1 airtight and make the two cavities CAV1 and CAV2 airtight with respect to each other. For this purpose, the open base of the cavity CAV1 is closed by a face of the piezoelectric pellet PA, while one of the bases of the front cavity CAV2 is closed by the other face of the piezoelectric pellet PA. The other base of the cavity CAV2, denoted $B_2$, remains open so as to emerge on a waveguide GU to be measured. This is because, when a waveguide GU is fixed to the acoustic impedance sensor CA3, one end of this waveguide is fixed in an airtight manner with the base $B_2$ so that the reference plane PR is parallel to the transverse section of the waveguide GU.

The microphone M1 is associated with the rear cavity CAV1 so as to be able to measure the acoustic pressure $p_1$ in the cavity CAV1 while the microphone M2 is associated with the front cavity CAV2 so as to be able to measure the acoustic pressure $p_2$ in the cavity CAV2.

It can be noted that the positioning of the microphones M1 and M2 may be in any position on each of the cavities CAV1 and CAV2, that is to say the distances L"1 and L"2 are not necessarily equal to half of the lengths L1 and L2.

The piezoelectric pellet PA is used as a source of excitation of the acoustic impedance sensor CA3, that is to say it is intended to be subjected to an electrical voltage that causes deformation thereof under the reverse piezoelectric effect. This deformation then causes a slight modification of the volume of each cavity and consequently a modification of the acoustic pressures inside each cavity CAV1 and CAV2.

The acoustic pressure $p_1$ measured in the rear cavity CAV1 is then, considering only the flat wave mode, that is to say according to a first-order approximation, proportional to the acoustic rate U generated by the piezoelectric pellet PA.

The input acoustic impedance Z is then given by equation (2) once the transfer function $H_{1,2}$ has been determined from measurements of the acoustic pressures taken by the microphones M1 and M2.

The acoustic impedance sensor CA3 has the advantage of being able to be modelled physically by a model with a single unknown function: the ratio between the sensitivities s1 and s2 of the two microphones.

This is because the transfer function $H_{12}$ between the microphones of the cavities CAV1 and CAV2 of the acoustic impedance sensor CA3 is given by equation (1) with $$\begin{cases} K = -j \cdot \frac{1}{Z_{c1}} \cdot \frac{s_2}{s_1} \cdot \frac{\sin(k \cdot L_1) \cdot \cos(k \cdot L_2^*)}{\cos(k \cdot L_1^*) \cdot \cos(k \cdot L_2)} \\ \beta = j \cdot Z_{c2} \cdot \tan(k \cdot L_2^*) \\ \delta = j \cdot \frac{\tan(k \cdot L_2)}{Z_{c2}} \end{cases} \quad (4)$$

in which $L_1$, $L_2$, $L_1^*$, $L_2^*$ are the dimensions of the acoustic impedance sensor, $$Z_{c1} = \frac{\rho \cdot c}{S_1} \text{ and } Z_{c2} = \frac{\rho \cdot c}{S_2}$$

are the characteristic impedances respectively of the cavity CAV1 and of the cavity CAV2, ρ being the density of air, c being the speed of sound, k=ω/c is the number of waves, $S_1$ the surface of the section of the cavity CAV1 given by $$S_1 = \frac{\pi \cdot d_1^2}{4}$$

and $S_2$ the surface of the section of the front cavity CAV2 given by $$S_2 = \frac{\pi \cdot d_2^2}{4}$$

where $d_1$ and $d_2$ are the diameters of the cavities CAV1 and CAV2.

In order to avoid resonances within the front and rear cavities, the heights L1, L"1 and L2 comply with an upper limit given by $$\begin{cases} L_1 < \frac{c}{2f_{max}} \\ L_1'' < \frac{c}{4f_{max}} \\ L_2 < \frac{c}{4f_{max}} \end{cases}$$

and the diameters $d_1$ and $d_2$ also comply with an upper limit given by $$\begin{cases} d_1 < \frac{1,84 \cdot c}{\pi \cdot f_{max}} \\ d_2 < \frac{1,84 \cdot c}{\pi \cdot f_{max}} \end{cases}$$

in which $f_{max}$ is the upper limit of the range of frequencies of use.

Thus, through its structure, the acoustic impedance sensor CA3 can be characterised physically by a model given by equation (2) that comprises only one unknown K.

This is because the parameters β and δ are known a priori since they are functions of the dimensions and characteristic impedance of the front cavity CAV2 and of the positioning of the microphone M2 in the cavity CAV2.

On the other hand, the parameter K is unknown because the ratio $$\frac{s_2}{s_1}$$

between the sensitivities of the two microphones is not known a priori.

A single calibration phase is therefore necessary for determining the ratio of the sensitivities of the microphones M1 and M2. For this purpose, a reference load is fixed to the acoustic impedance sensor CA3 at the reference plane PR and the piezoelectric pellet PA is then electrically excited in order to create an acoustic rate U. This reference load is defined so that the impedance thereof is "infinite". In this case, following the measurement of the acoustic pressures $p_1$ and $p_2$ and the determination of the transfer function, called $H_\infty$, the parameter K is determined by:

$$K = H_\infty \delta$$

According to one embodiment of the acoustic impedance sensor CA3, the heights L1, L"$_1$ and L2 are equal respectively to 21.4 mm, 9.5 mm and 13.5 mm and the diameter $d_1$ is equal to 18 mm and the diameter $d_2$ is equal to 16 mm.

Under these conditions, the range of frequencies of use of the acoustic impedance sensor CA3 extends from a few Hertz to 6 kHertz, thus allowing a characterisation of a passive acoustic element over a very wide range of frequencies.

Figure 5:
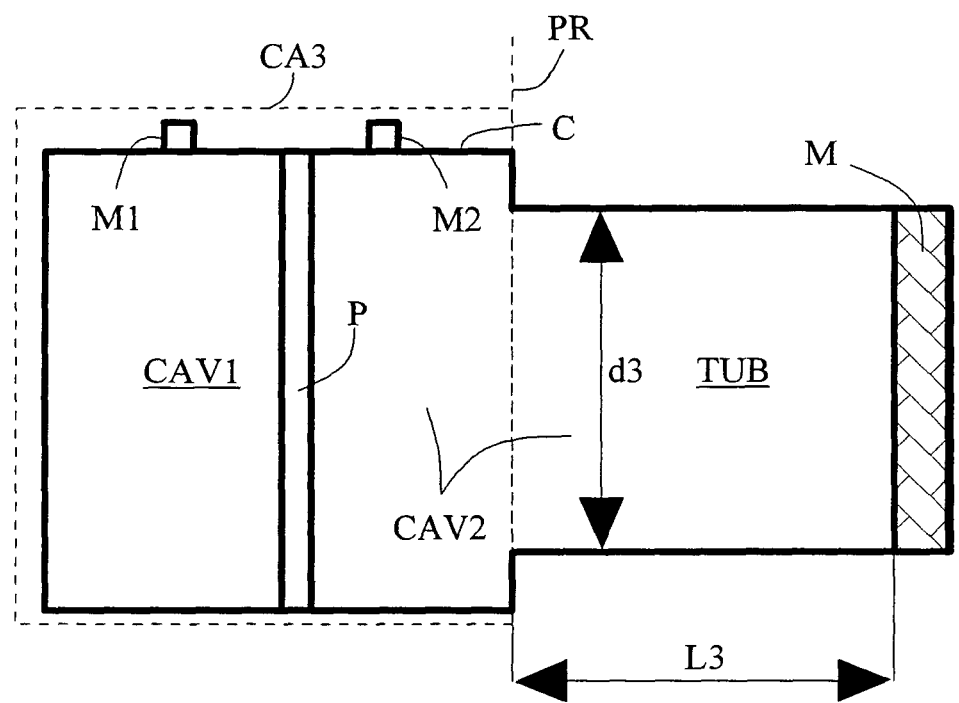
FIG. 5 illustrates schematically the use of the acoustic impedance sensor for characterising material.

By way of illustration of the use of the acoustic impedance sensor CA3, FIG. 5 shows schematically the use of the acoustic impedance sensor CA3 for characterisation of material.

For this purpose, a rigid tube TUB of diameter d3 and closed at one of its ends is fixed to the acoustic impedance sensor CA3 at the reference plane PR, that is to say the open end of the tube TUB is fixed sealingly to the sensor. At the bottom of this tube TUB a sample of the material to be characterised is placed, the surface of the material on the sensor side being distant from the reference plane PR by a distance L3 greater than the diameter d3 of the tube TUB.

The sensor, once calibrated, is excited by the piezoelectric pellet PA and acoustic pressure measurements $p_1$ and $p_2$ are recorded. The calculation means associated with the microphones M1 and M2 then determine the transfer function $H_{1,2}$ in order to obtain the input acoustic impedance Z then enabling the intrinsic characteristics of the material to be determined.

For example, the coefficient of absorption of the material to be characterised α is given by $$\alpha = 1 - |Re|^2$$

with Re the coefficient of reflection given by $$Re = \frac{Z - Z_c}{Z + Z_c}$$

in which $$Z_c = \frac{\rho c}{S_3}$$

where $$S_3 = \frac{\pi d_3^2}{4}$$

is the surface of the section of the tube TUB.

The invention claimed is:

1. An acoustic impedance sensor designed to measure the input acoustic impedance (Z) of a waveguide (GU), the sensor comprising a source coupled to the waveguide (GU) by means of an open cavity (CAV2), referred to as the front cavity, delimited by the source and emerging on the said waveguide (GU), and a cavity (CAV1), referred to as the rear cavity, closed by said source, the acoustic pressure in each cavity being measured by a microphone, said sensor being configured such that said source is a piezoelectric pellet (PA) mounted between the rear cavity (CAV1) that is in the form of a straight cylinder and the front cavity (CAV2) that is in the form of a straight cylinder, the height (L2) of the front cavity and the height (L1) of the rear cavity being respectively less than one quarter and one half of the wavelength of the excitation emitted by said piezoelectric pellet (PA) and the diameters (d1 and d2) of the two cavities (CAV1 and CAV2) being less than half of said wavelength.

2. The sensor according to claim 1, being configured such that, each microphone is connected to digital calculation means provided to calculate a transfer function $H_{12}$ from the electrical quantities measured at the terminals of the two microphones (M1 and M2), the transfer function being given by $$H_{12} = K \frac{Z + \beta}{1 + \delta Z}$$

in which K, b and d are complex functions of the excitation frequency emitted by the piezoelectric pellet, which are defined by $$\begin{cases} K = -j \frac{1}{Z_{c1}} \cdot \frac{s_2}{s_1} \cdot \frac{\sin(k \cdot L_1) \cdot \cos(k \cdot L_2^*)}{\cos(k \cdot L_1^*) \cdot \cos(k \cdot L_2)} \\ \beta = j \cdot Z_{c2} \cdot \tan(k \cdot L_2^*) \\ \delta = j \cdot \frac{\tan(k \cdot L_2)}{Z_{c2}} \end{cases}$$

with $L_1, L_2, L_1", L_2"$ respectively the heights of the rear and front parts of the sensor and the positioning of the microphones vis-à-vis the bases of the sensor, $$Z_{c1} = \frac{\rho \cdot c}{S_1} \text{ and } Z_{c2} = \frac{\rho \cdot c}{S_2}$$

the characteristic impedances respectively of the front cavity (CAV1) and of the rear cavity (CAV2), ρ the density of air, c the speed of the sound, k=w/c is the number of waves, $S_1$ the surface of the section of the cavity CAV1 given by $$S_1 = \frac{\pi \cdot d_1^2}{4}$$

and $S_2$ the surface of the section of the front cavity CAV2 given by $$S_2 = \frac{\pi \cdot d_2^2}{4}$$

where $d_1$ and $d_2$ are the diameters of the two cavities.

3. The sensor according to claim 2, being configured such that the complex function K is determined by a calibration phase.

4. The sensor according to claim 3, being configured such that each infinite reference impedance load is used during the said calibration phase.

* * * * *